(12) United States Patent
Notomi

(10) Patent No.: US 10,166,824 B2
(45) Date of Patent: Jan. 1, 2019

(54) INDIRECT TIRE PRESSURE MONITORING SYSTEM

(71) Applicant: HONDA MOTOR CO., LTD., Tokyo (JP)

(72) Inventor: Shinya Notomi, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/700,527

(22) Filed: Sep. 11, 2017

(65) Prior Publication Data
US 2018/0072116 A1   Mar. 15, 2018

(30) Foreign Application Priority Data
Sep. 12, 2016  (JP) ................................. 2016-177692

(51) Int. Cl.
| | |
|---|---|
| B60C 23/00 | (2006.01) |
| B60C 23/06 | (2006.01) |
| B60C 23/04 | (2006.01) |
| B60C 23/20 | (2006.01) |

(52) U.S. Cl.
CPC ........ B60C 23/061 (2013.01); B60C 23/0408 (2013.01); B60C 23/20 (2013.01)

(58) Field of Classification Search
CPC ..... B60C 23/00; B60C 23/001; B60C 23/003; B60C 23/004; B60C 23/0408; B60C 23/0488; B60C 23/0489; B60C 23/061; B60C 23/062; B60C 23/063; B60C 23/20
See application file for complete search history.

(56) References Cited

U.S. PATENT DOCUMENTS

| | | | | |
|---|---|---|---|---|
| 6,092,028 A | * | 7/2000 | Naito .................... | B60C 23/062 702/138 |
| 2014/0088816 A1 | * | 3/2014 | Shima ................. | B60C 23/0416 701/29.1 |
| 2015/0149110 A1 | * | 5/2015 | Shin .................... | B60C 23/0457 702/130 |

FOREIGN PATENT DOCUMENTS

| | | |
|---|---|---|
| JP | 2004-243960 | 9/2004 |
| JP | 2013-28251 | 2/2013 |

* cited by examiner

*Primary Examiner* — Van T Trieu
(74) *Attorney, Agent, or Firm* — Rankin, Hill & Clark LLP

(57) ABSTRACT

An indirect tire pressure monitoring system is provided that estimates a pressure in a tire more accurately than before. The system includes an estimated internal pressure transmitter (control unit) that calculates and transmits an estimated internal pressure of a tire when a vehicle is travelling based on a wheel speed, a measured internal pressure of the tire at halt and a measured temperature of the tire at halt. The system measures the internal pressure and the temperature for each tire, and carries out deflation evaluation independently for each tire.

9 Claims, 7 Drawing Sheets

INDIRECT TIRE PRESSURE MONITORING SYSTEM

CROSS REFERENCE TO RELATED APPLICATION

This application claims the benefit of priority to Japanese Patent Application No. 2016-177692 filed on Sep. 12, 2016, the disclosures of all of which are hereby incorporated by reference in their entireties.

FIELD OF THE INVENTION

The invention relates to an indirect tire pressure monitoring system.

DESCRIPTION OF THE RELATED ART

Conventionally, a tire pressure monitoring system is known that detects a decrease in air pressures of tires mounted on wheels and warns a driver. Two kinds of systems are known, which are a direct tire pressure monitoring system having a pressure sensor in each tire to directly detect an air pressure (see Japanese Patent Application Publication No. 2013-28251) and an indirect tire pressure monitoring system that indirectly detects an air pressure based on a wheel speed or the like (see Japanese Patent Application Publication No. 2004-243960).

The indirect tire pressure monitoring system does not need a pressure sensor in each tire, resulting in a decrease in a manufacturing cost and cumbersome maintenance and the like, compared with the direct tire pressure monitoring system.

SUMMARY OF THE INVENTION

The indirect tire pressure monitoring system that detects the air pressure based on the wheel speed (Japanese Patent Application Publication No. 2004-243960) utilizes a phenomenon in which a deflated tire is deformed when a vehicle is travelling to have smaller dynamic load radius, making the deflated tire rotate faster than a tire having a normal pressure. That is, in the system, an air pressure of the tire is estimated based on the wheel speed. An indirect tire pressure monitoring system is desired to estimate a tire pressure more accurately than before.

The invention is intended to provide an indirect tire monitoring system that is capable of estimating a tire pressure more accurately than before.

An indirect tire pressure monitoring system of the invention that solves the above problem includes an estimated internal pressure transmitter that calculates and transmits an estimated internal pressure of a tire when a vehicle is traveling based on a wheel speed, a measured internal pressure of the tire at halt, and a measured temperature of the tire at halt.

According to the invention, an indirect tire pressure monitoring system is provided that estimates a tire pressure more accurately than before.

DETAILED DESCRIPTION OF THE PREFERRED EMBODIMENTS

Hereinafter, a preferred embodiment of the invention will be described in detail.

An indirect tire pressure monitoring system of the embodiment specifically calculates an estimated internal pressure of a tire based on a wheel speed, a measured internal pressure of the tire at halt, and a measured temperature of the tire at halt.

Figure 1:
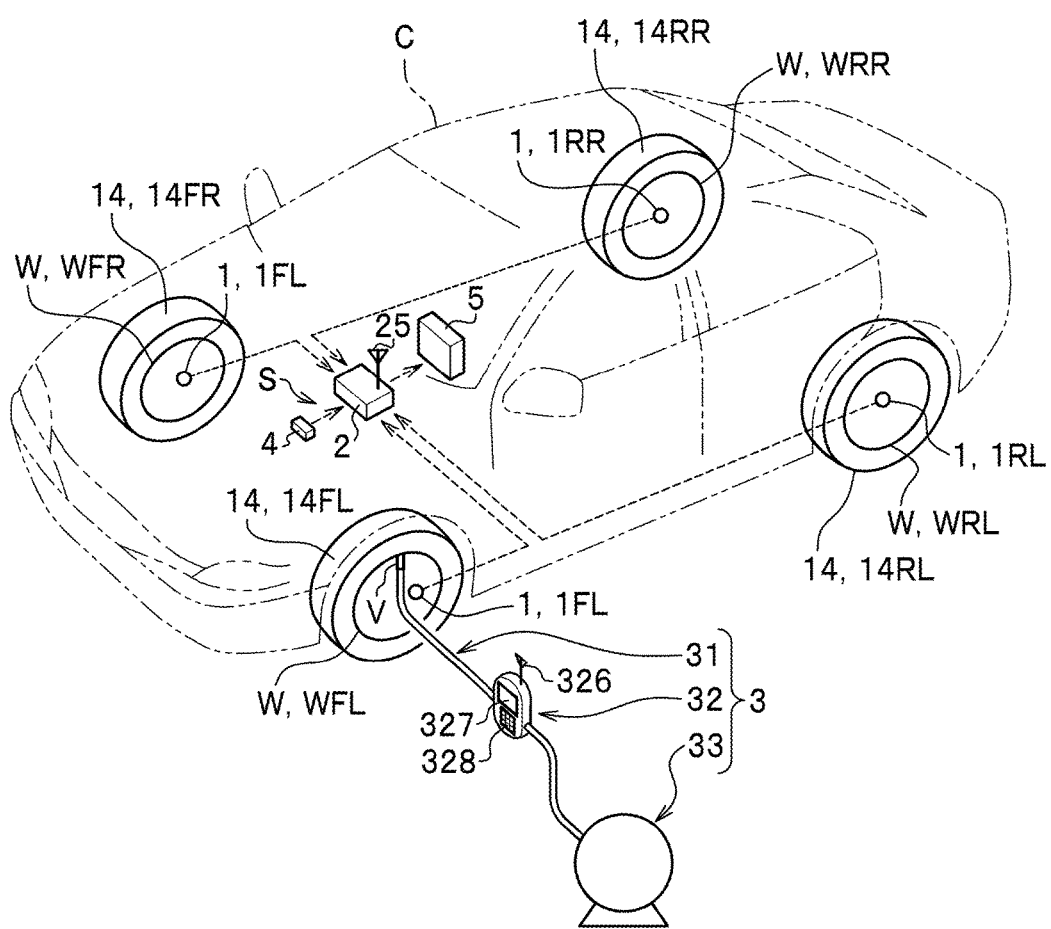
FIG. 1 is schematic diagram of a vehicle having an indirect tire pressure monitoring system according to an embodiment of the invention.

FIG. 1 is a schematic diagram of a vehicle C having an indirect tire pressure monitoring system S (hereinafter, simply referred to as a system S) of the embodiment.

As shown in FIG. 1, the vehicle C includes four wheels W (WFR, WFL, WRR, WRL) respectively mounted with tires 14 (14FR, 14FL, 14RR, 14RL).

The system S of the embodiment includes wheel speed sensors 1 (1FR, 1FL, 1RR, 1RL), a control unit 2, an air gauge 3 as tire information measuring device, an outside air temperature sensor 4, and a display 5.

Note that, in the specification, when members arranged in association with four wheels WFR, WFL, WRR, WRL are referred to collectively, a numeral part is used for the tires 14FR, 14FL, 14RR, 14RL, the wheel speed sensors 1FR, 1FL, 1RR, 1RL or the like. Further, when a member is referred to individually, a numeral part and an alphabet part as FR, FL, RR and RL are used, depending on an arranged position. Therefore, when the members are referred to collectively hereinbelow, the "wheel W" is used, for example, and when the member (position) is referred to individually, the "wheel WFR" is used, for example. Other members are referred to likewise. When the members are reefed to collectively, for example, the "tire 14" and the "wheel speed sensor 1" are used, and when the member (position) is referred to individually, for example, the "tire 14FR" or the "wheel speed sensor 1FR" is used.

The wheel speed sensor 1 is used, for example, in a brake lock prevention system. The wheel speed sensor 1 converts the change in a magnetic field accompanying to rotations of a magnetic encoder mounted on the same axis as the wheel W into pulse signals (wheel speed detection signals) with a magnetic pickup. The pulse signals (wheel speed detection signals) are transmitted to the control unit 2.

Note that the number of pulses per unit time included in the pulse signals is proportional to the rotational speed of the wheel W. After an ignition switch is turned on, the pulse signals are always transmitted to the control unit 2 regardless of the rotations of the wheel W. The control unit 2 converts the pulse signals into the wheel speed (rotational angular velocity).

The control unit 2 according to the embodiment is an estimated internal pressure transmitter that transmits estimated internal pressures Pe of respective tires 14FR, 14FL, 14RR and 14RL, and is also an estimated internal pressure corrector that corrects the estimated internal pressures Pe based on an outside temperature Ta.

Figure 2:
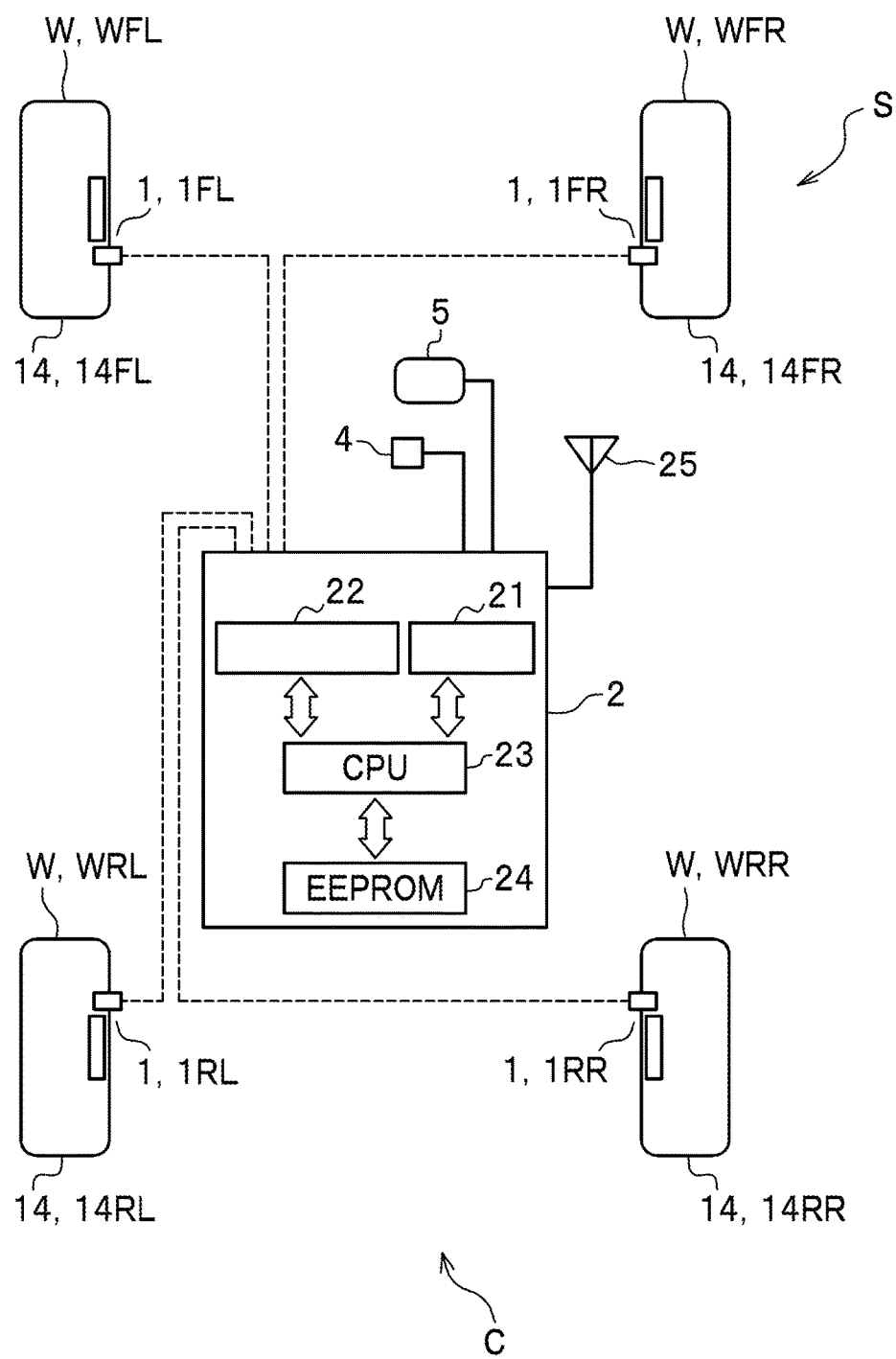
FIG. 2 is a block diagram of a control unit (estimated internal pressure transmitter, estimated internal pressure corrector) of the indirect tire pressure monitoring system.

FIG. 2 is a block diagram of the control unit 2 (estimated internal pressure transmitter, estimated internal pressure corrector).

As shown in FIG. 2, the control unit 2 includes a transceiver 21, an input/output interface 22, a CPU 23, and an EEPROM 24. Further, the control unit 2 includes a memory, various electric circuits, and a power supply circuit, in addition to the transceiver 21, the input/output interface 22, the CPU 23 and the EEPROM 24.

In FIG. 2, the CPU stands for Central Processing Unit, and the EEPROM stands for Electrically Erasable Programmable Read-Only Memory.

The transceiver 21 wirelessly transmits a recommended internal pressure Pr for tires 14FR, 14FL, 14RR and 14RL to a transceiver 323 (see FIG. 3) in the air gauge 3 (see FIG. 1) to be described later in detail. The recommended internal pressure Pr will be described later.

The transceiver 21 wirelessly transmits/receives tire information such as the recommended internal pressure Pr, a measured internal pressure Pm, and a measured temperature Tm to/from the transceiver 323.

Note that the wireless transmission/reception is carried out via an antenna 25 of the control unit 2 and an antenna 326 of the air gauge 3.

The input/output interface 22 serves to input and output signals to/from the wheel speed sensor 1, the outside air temperature sensor 4, the display 5 and the like.

The CPU 23 includes a logic circuit, and a memory, and integrally controls the control unit 2. Further, the CPU 23 receives the wheel speeds of wheels WFR, WFL, WRR and WRL, the measured internal pressures Pm of tires 14FR, 14FL, 14RR and 14RL at halt, the measured temperatures Tm of tires 14FR, 14FL, 14RR, 14RL at halt, the outside temperature Ta and the like. The CPU 23 carries out given steps in a flowchart to be described later based on these inputted signals.

The EEPROM (also written as E2PROM) 24 is an electrically rewritable and erasable programmable ROM. The EEPROM is different from an EPROM that needs ultraviolet rays for erasure, and contents are rewritable several hundred thousands of times while the EEPROM is mounted on a board.

Note that the detail of each component in the control unit 2, including the CPU 23, will be described later with reference to the flowchart.

Next, the air gauge 3 as tire information measuring device will be described.

As shown in FIG. 1, the air gauge 3 mainly includes a nozzle 31, a gauge body 32 and an air supply unit 33 such as a pressure accumulator. Note that the system S may include the air gauge 3 (tire information measuring device) without the air supply unit 33 as will be described later.

The nozzle 31 is a pipe body that extends from the gauge body 32. An end of the nozzle 31 is connected to an air valve V of the wheel W to supply a compressed air into an air chamber of the tire 14. Further, a pressure sensor 311 and a temperature sensor 312 (see FIG. 3) to be described later are mounted at the end of the nozzle 31 of the embodiment.

The pressure sensor 311 and the temperature sensor 312 (see FIG. 3) detect and transmit the internal pressure and the temperature of the tire 14 to the gauge body 32 after the pressure of the tire 14 is regulated. The detected pressure and the temperature correspond to the "measured internal pressure Pm of the tire" and the "measured temperature Tm of the tire" described above.

Note that the pressure sensor 311 and the temperature sensor 312 (see FIG. 3) of the air gauge 3 may be mounted anywhere as far as the internal pressure and the temperature of the tire 14 (see FIG. 1) are detected, and may be mounted in the gauge body 32 to be described below.

Figure 3:
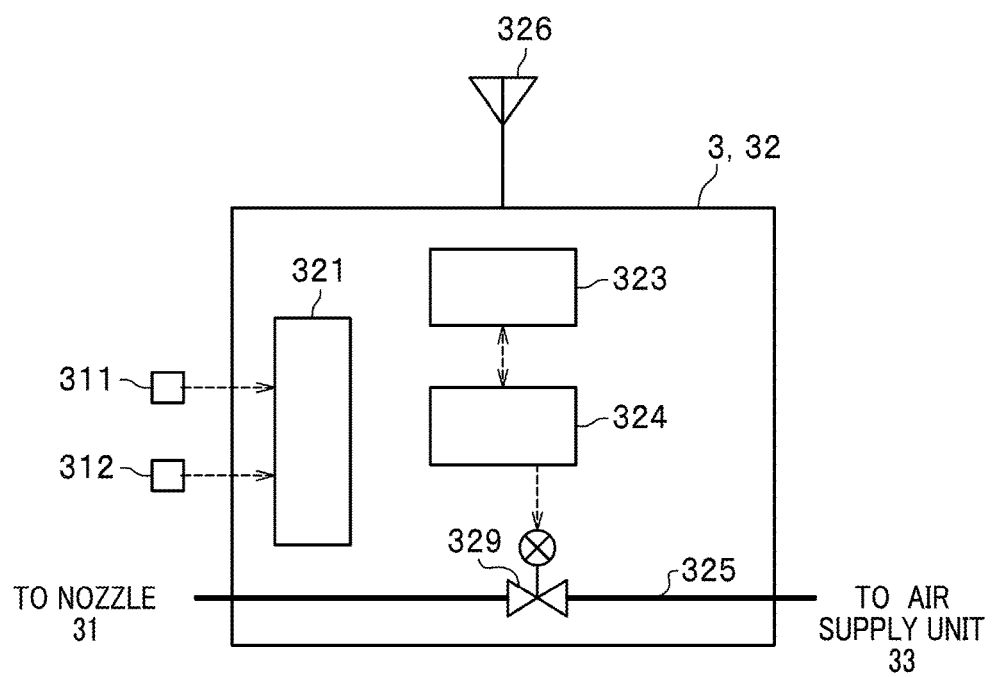
FIG. 3 is a block diagram of an air gauge (tire information measuring device) of the indirect tire pressure monitoring system.

FIG. 3 is a block diagram of the air gauge 3 (gauge body 32).

As shown in FIG. 3, the gauge body 32 of the air gauge 3 includes an input/output interface 321, the transceiver 323 (wireless transmitter), a CPU 324, a memory (not shown), a pipe 325 that connects the nozzle 31 with the air supply unit 33 (see FIG. 1), an antenna 326 mounted on the gauge body 32, and a solenoid valve 329. Further, the gauge body 32 includes an operation panel 328 and a display 327 (see FIG. 1).

The input/output interface 321 serves to receive the signals of the measured internal pressure Pm and the measured temperature Tm respectively outputted from the pressure sensor 311 and the temperature sensor 312. The output signals from the pressure sensor 311 and the temperature sensor 312 are converted to digital values through an A/D converter (not shown) so as to be inputted to the CPU 324.

The transceiver 323 wirelessly transmits/receives the tire information, such as the recommended internal pressure Pr to be described later for the tires 14FR, 14FL, 14RR, 14RL, the measured internal pressure Pm, and the measured temperature Tm to/from the transceiver 21 of the control unit 2 (see FIG. 2). The wireless transmission/reception is carried out via the antennas 25, 326 described above. Note that the transceiver 323 is a wireless transmitter that transmits the measured internal pressure Pm and the measured temperature Tm to the transceiver 21. The transceiver 21 is a wireless receiver that receives the measured internal pressure Pm and the measured temperature Tm from the transceiver 323.

The CPU 324 includes a logic circuit and a memory, and, as shown in a flowchart to be described later, regulates the pressure of the tire 14 based on given conditions to transmit the signals of the measured internal pressure Pm and the measured temperature Tm of the tire 14 after the pressure is regulated to the control unit 2.

The compressed air in the air supply unit 33 (see FIG. 1) is fed through the pipe 325 to the nozzle 31. A joint (not shown) for detachable attachment to the air supply unit 33 is provided at the end of the pipe 325, which is on the side to be attached to the air supply unit 33.

The solenoid valve 329 opens and closes the channel of the pipe 325 based on a command from the CPU 324.

The operation panel 328 (see FIG. 1) includes touch buttons with which a user manually inputs information to the CPU 324. The touch buttons are used to input alphabets, numbers and other symbols to be displayed on the LCD screen.

The display 327 (see FIG. 1) is the LCD screen. The position of the tire 14 of which pressure is being regulated, the recommended internal pressure Pr, the measured internal pressure Pm, and the measured temperature Tm of the tire 14, the characters on the touch buttons touched by the user are displayed on the display 327 in cooperation with the CPU 324.

As shown in FIG. 1, the outside air temperature sensor 4 detects and transmits the outside air temperature Ta of the vehicle C to the control unit 2. The outside air temperature sensor 4 is preferably disposed at a position away from a heat source of the vehicle C.

The display 5 (see FIG. 2) is an LCD screen. A schematic arrangement of the tires 14FR, 14FL, 14RR, 14RL, the estimated internal pressure Pe, warning symbols and the like are displayed on the display 5 in cooperation with the CPU 23.

<Overall Operation of the System S>

Figure 4:
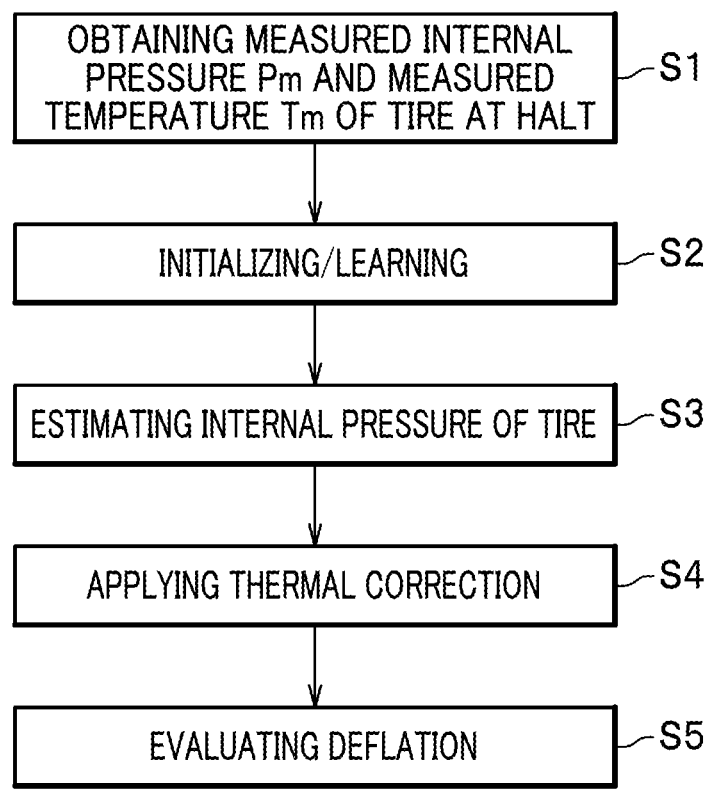
FIG. 4 is a flowchart describing an overall operation of the indirect tire pressure monitoring system.

FIG. 4 is a flowchart for describing an overall operation of the system S.

As shown in FIG. 4, the system S in the embodiment firstly carries out a step of "obtaining the measured internal pressure Pm and the measured temperature Tm of the tire at halt" (step S1). The measured internal pressure Pm and the measured temperature Tm in the step are obtained after the pressure of the tire 14 has been regulated. The measured internal pressure Pm and the measured temperature Tm are measured with the air gauge 3 (see FIG. 1) and are wirelessly transmitted from the air gauge 3 to the control unit 2 as described above. The step will be described later in detail inclusive of measuring the measured internal pressure Pm and the measured temperature Tm with the air gauge 3.

Next, the system S carries out a step of "initializing/learning" (step S2). In the step, map data used in a step of "estimating the internal pressure of the tire" (step S3) to be described later is accumulated. As will be described later, the step is mainly carried out with the CPU 23 and the EEPROM 24 (see FIG. 2) of the control unit 2 (see FIG. 2).

In the step of "estimating the internal pressure of the tire" (step S3), the internal pressure of each of the tires 14FR, 14FL, 14RR, 14RL is estimated based on the measured wheel speed (rotational angular velocity) of each of the wheels WFR, WFL, WRR, WRL and the map data accumulated in the step of "initializing/learning" (step 2). Further, in a step of "applying thermal correction" (step S4), thermal correction is applied to the internal pressure of each of the tires 14FR, 14FL, 14RR, 14RL estimated in the step of "estimating the internal pressure of the tire". The step S4 is carried out based on the measured temperature Tm of each of the tires 14FR, 14FL, 14RR, 14RL at halt obtained in step S1 and the outside temperature Ta detected with an outside temperature sensor 4 (see FIG. 2). The step of "estimating the internal pressure of the tire" and the step of "applying thermal correction" will be described later in detail.

Next, the system S carries out a step of "evaluating deflation" (step S5). In step S5, the estimated internal pressure Pe in each of the tires 14FR, 14FL, 14RR, 14RL corrected in the step of "applying thermal correction" (step S4) is compared with an internal pressure threshold value Pt to be described later. If the estimated internal pressure Pe is less than the internal pressure threshold value Pt, the control unit 2 instructs the display 5 to display that fact and instructs an alarm (not shown) to issue a warning sound.

Next, steps S1 to S5 shown in FIG. 4 will be described in more detail. First of all, operation of the air gauge 3 (tire information measuring device) will be described.

Figure 5:
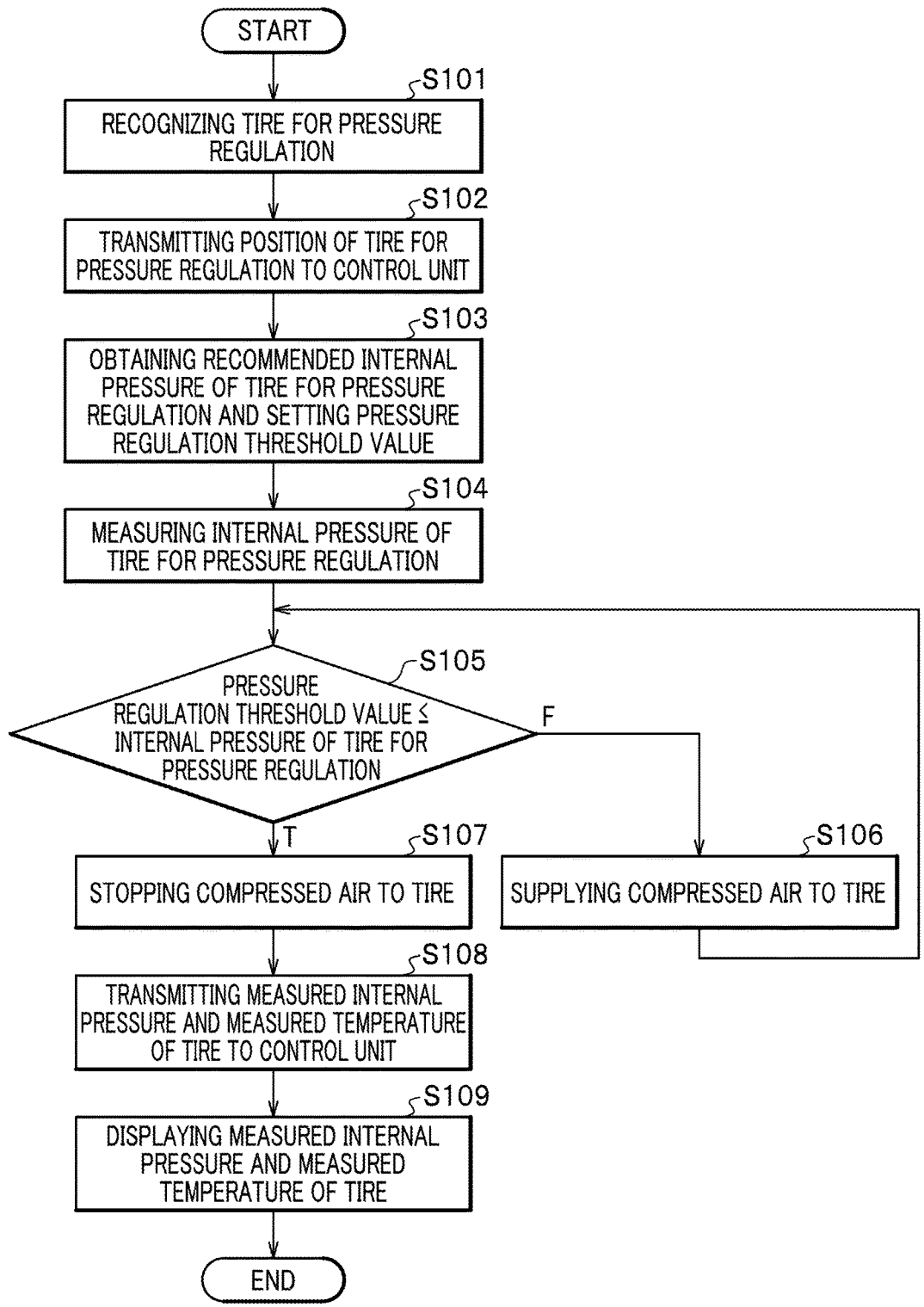
FIG. 5 is a flowchart describing operation of the air gauge.

FIG. 5 is a flowchart showing the operation of the air gauge 3.

As shown in FIG. 5, the air gauge 3 recognizes a tire having a need for pressure regulation (step S101) in the step of "obtaining the measured internal pressure Pm and the measured temperature Tm of the tire at halt" (step S1 in FIG. 4).

Note that, since the air gauge 3 in the embodiment is assumed to have the air supply unit 33, the tire that has not been regulated is firstly regulated in step S101.

In step S101, as shown in FIG. 1, the nozzle 31 of the air gauge 3 is firstly connected to the air valve V of the tire 14 having a need for pressure regulation.

At this time, the user inputs the position information specifying the position of the wheel W via the operation panel 328 (see FIG. 1) to the CPU 324 of the gauge body 32. Then, the CPU 324 wirelessly transmits the position information of the wheel W (tire having a need for pressure regulation) to the control unit 2 (step S102).

Specifically, for example, as shown in FIG. 1, in a case where the nozzle 31 is connected to the air valve V of the wheel WFL, the user inputs a given index of the wheel WFL on the operation panel 328. Here, it is assumed that character strings of WFR, WFL, WRR, WRL are allocated as the indices for four wheels W, for example. In this case, the user touches the alphabet buttons "W", "F" and "L" on the operation panel 328. As a result, the CPU 324 wirelessly informs the control unit 2 that the wheel W having its pressure regulated is the wheel WFL located at the front left. In other words, the position information (W•F•L) of the wheel W is transmitted from the CPU 324 to the control unit 2 via the transceiver 323, the antenna 326 and the like.

Note that the position information (W•F•L) of the wheel W may be transmitted to the control unit 2 via a short-range communication using an RF (Radio Frequency) tag mounted on each of the wheels WFR, WFL, WRR, WRL or a position in the vicinity thereof and the air gauge 3 that reads the tag.

In response to this, then, the CPU 23 in the control unit 2 receives the position information (W•F•L) (not shown) via the antenna 25 and the transceiver 21 and transmits the recommended internal pressure Pr of the tire 14FL of the wheel WFL to the air gauge 3 by referring to the EEPROM 24. That is, the recommended internal pressure Pr of the tire 14FL is transmitted from the CPU 23 to the air gauge 3 via the transceiver 21, the antenna 25 and the like. The CPU 324 of the air gauge 3 obtains the recommended internal pressure Pr of the tire 14FL (tire having a need for pressure regulation) via the antenna 326, the transceiver 323 and the like, and sets a pressure regulation threshold value Ptr of the tire 14FL based on the recommended internal pressure Pr (step 103).

The recommended internal pressure Pr of the tire 14 is preset by a tire maker, a car maker or the like based on a size and a type of the tire 14, an arranged front or rear wheel, vehicle type and the like. The recommended internal pressure Pr is pre-stored in the EEPROM 24 (see FIG. 2) by a BCM terminal or the like when the vehicle C is delivered to the user, when the vehicle C is periodically inspected, when the tire 14 is replaced, or the like.

The pressure regulation threshold value Ptr is set by the CPU 324 (see FIG. 3) based on the recommended internal pressure Pr. In the embodiment, the pressure regulation threshold value Ptr is set to be equal to the recommended internal pressure Pr, but may be set to be nearly equal to the recommended internal pressure Pr.

Next, the CPU 324 measures the measured internal pressure Pm of the tire 14 at halt (step S104). In step S105, the CPU 324 determines if the measured internal pressure Pm of the tire 14, that is, "the internal pressure of the tire for pressure regulation" is equal to or more than the pressure regulation threshold value Ptr.

If the CPU 324 determines that "the internal pressure of the tire having a need for pressure regulation" is less than the pressure regulation threshold value Ptr (False in step S105), the solenoid valve 329 (see FIG. 3) is opened. The compressed air from the air supply unit 33 is supplied to the tire 14 via the pipe 325 (see FIG. 3) and the nozzle 31 (see FIG.

1) (step S106). Then, the operation is returned to step S105. If "the internal pressure of the tire having a need for pressure regulation" is equal to or more than the pressure regulation threshold value Ptr (True in step S105), the CPU 324 closes the solenoid valve 329 (see FIG. 3). The compressed air from the air supply unit 33 to the tire 14 is stopped (step S107).

Then, the CPU 324 wirelessly transmits the signals of the measured internal pressure Pm and the measured temperature Tm of the tire 14 to the control unit 2 (see FIG. 2) via the transceiver 323 and the antenna 326 (see FIG. 3) (step S108). In response to this, the control unit 2 wirelessly receives the signals of the measured internal pressure Pm and the measured temperature Tm of the tire 14 via the antenna 25 and the transceiver 21 (see FIG. 2). The CPU 23 in the control unit 2 causes the EEPROM 24 (see FIG. 2) to store the measured internal pressure Pm and the measured temperature Tm of the tire 14. This ends step S1 in FIG. 4.

The CPU 324 of the air gauge 3 causes the display 327 to display the measured internal pressure Pm and the measured temperature Tm of the tire 14 (step S109). This ends the step of regulating the pressure of the tire 14 and the step of transmitting the measured internal pressure Pm and the measured temperature Tm of the tire 14 to the control unit 2.

The step of regulating the pressure of the tire 14 and the step of transmitting the measured internal pressure Pm and the measured temperature Tm are carried out for all the four tires 14FR, 14FL, 14RR, 14RL. Accordingly, the pressure of each of the tires 14FR, 14FL, 14RR, 14RL is regulated to a normal pressure (measured internal pressure Pm), and the control unit 2 is notified that the step of regulating the pressure is completed.

Next, a description will be given of the air gauge 3 (tire information measuring device), which has no air supply unit 33 according to a modification.

The air gauge 3 according to the modification is not shown but is different from the air gage 3 (see FIG. 1) in that the air supply unit 33 (see FIG. 1), the pipe 325 and the solenoid valve 329 (see FIG. 3) are not included. Further, the air gauge 3 according to the modification includes a tubular connecting joint that is connected to the air valve V (see FIG. 1) in place of the nozzle 31 shown in FIG. 1 and includes the pressure sensor 311 and the temperature sensor 312 (see FIG. 3).

Next, operation of the air gauge 3 according to the modification will be described.

The air gauge 3 according to the modification does not carry out the step of regulating the pressure of the tire 14. That is, among all the operation of the system S shown in FIG. 4, the step of "obtaining the measured internal pressure Pm and the measured temperature Tm of the tire at halt" (step S1) is carried out for the vehicle C (see FIG. 1) of which tire 14 has been already regulated in a separate step.

That is, out of the steps S101 to S109 shown in FIG. 5, the air gauge 3 according to the modification carries out the step of recognizing the tire 14 having a need for pressure regulation (step S101), the step of transmitting the position of the tire 14 having a need for pressure regulation to the control unit 2 (step S102), the step of transmitting the measured internal pressure Pm and the measured temperature Tm of the tire 14 at halt to the control unit 2 (step S108), and the step of displaying the measured internal pressure Pm and the measured temperature Tm of the tire 14 at halt on the display 5 (step S109).

Next, operation of the control unit 2 in the system S will be described.

Figure 6:
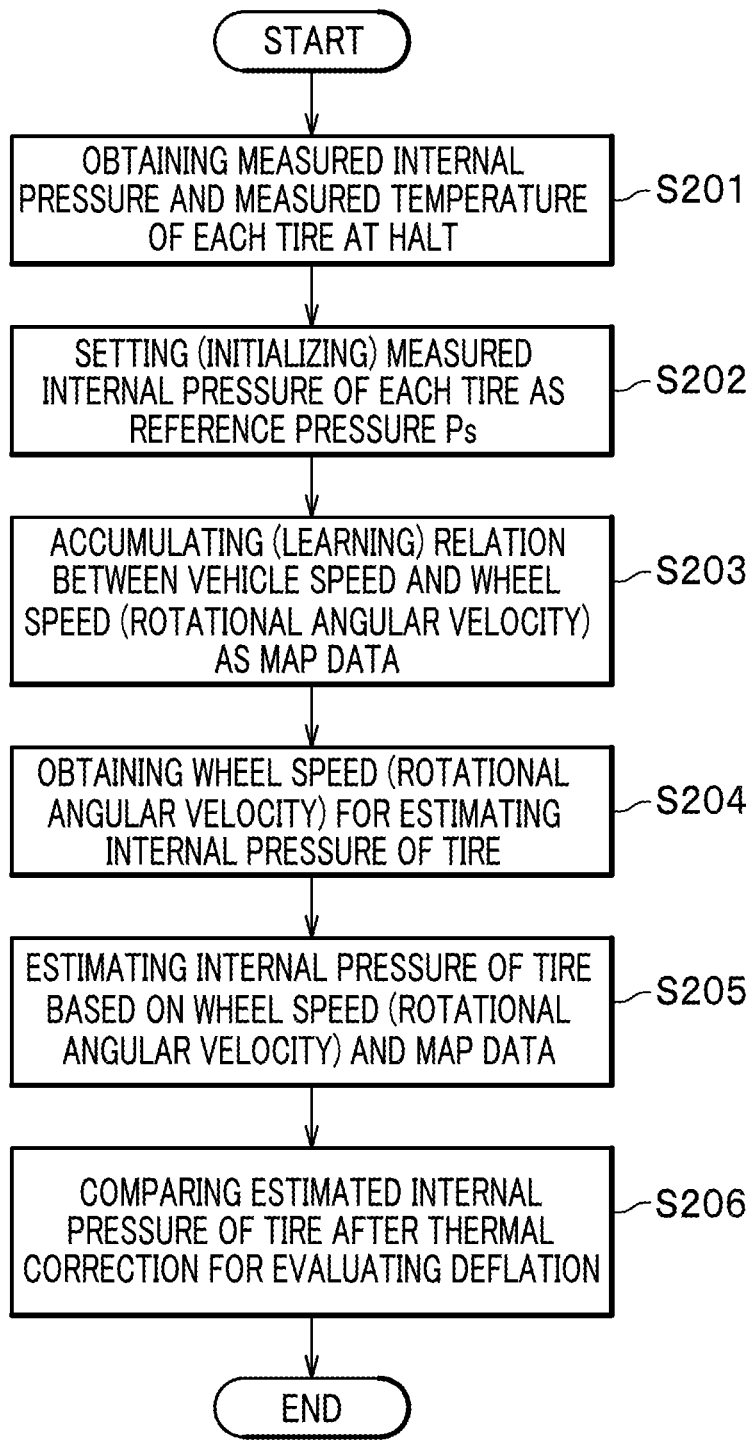
FIG. 6 is a flowchart describing operation of the control unit of the indirect tire pressure monitoring system.

FIG. 6 is a flowchart showing the operation of the control unit 2.

As shown in FIG. 6, the CPU 23 in the control unit 2 (see FIG. 2), first of all, obtains the measured internal pressure Pm and the measured temperature Tm of each of the tires 14FR, 14FL, 14FR, 14RL at halt (step S201), when carrying out the step of initializing/learning (see step S2 in FIG. 4). That is, the CPU 23 receives the measured internal pressure Pm and the measured temperature Tm transmitted in step S108 in FIG. 5 via the antenna 25 and the transceiver 21 (see FIG. 2). The CPU 23 causes the EEPROM 24 (see FIG. 2) to store the received measured internal pressure Pm and the measured temperature Tm. Then, the CPU 23 sets the measured internal pressure Pm of each of the tires 14FR, 14FL, 14RR, 14RL at halt as a reference pressure Ps (step S202).

Further, the CPU 23 obtains a wheel speed of each of the wheels WFR, WFL, WRR, WRL having the tires 14FR, 14FL, 14RR, 14RL at the reference pressure Ps when the vehicle C is travelling. Specifically, the CPU 23 obtains the rotational angular velocity of each of the wheels WFR, WFL, WRR, WRL based on the pulse signals (wheel speed detection signals) transmitted from the wheel speed sensor 1 (FIG. 2).

With this operation, the CPU 23 accumulates the map data that satisfies a relation of "vehicle speed=(effective rolling radius of each tire 14 at the reference pressure Ps)×(wheel speed (rotational angular velocity))" in the EEPROM 24. That is, the CPU 23 accumulates the relation between the vehicle speed of the vehicle C mounted with the tire 14 at the reference pressure Ps and the wheel speed (rotational angular velocity) as map data (step S203).

Next, the CPU 23 obtains the wheel speed (rotational angular velocity) of each of the wheels WFR, WFL, WRR, WRL (see FIG. 1) to estimate the internal pressure of each of the tires 14FR, 14FL, 14RR, 14RL (see FIG. 1) when the vehicle C (see FIG. 1) is travelling (step S204). The CPU 23 calculates the wheel speed (rotational angular velocity) based on the pulse signals (wheel speed detection signals) transmitted from each of the wheel speed sensors 1FR, 1FL, 1RR, 1RL (see FIG. 2) as described above.

Then, the CPU 23 estimates the internal pressure of each of the tires 14FR, 14FL, 14RR, 14RL (see FIG. 1) based on the wheel speed (rotational angular velocity) and the accumulated map data (step S205).

Figure 7:
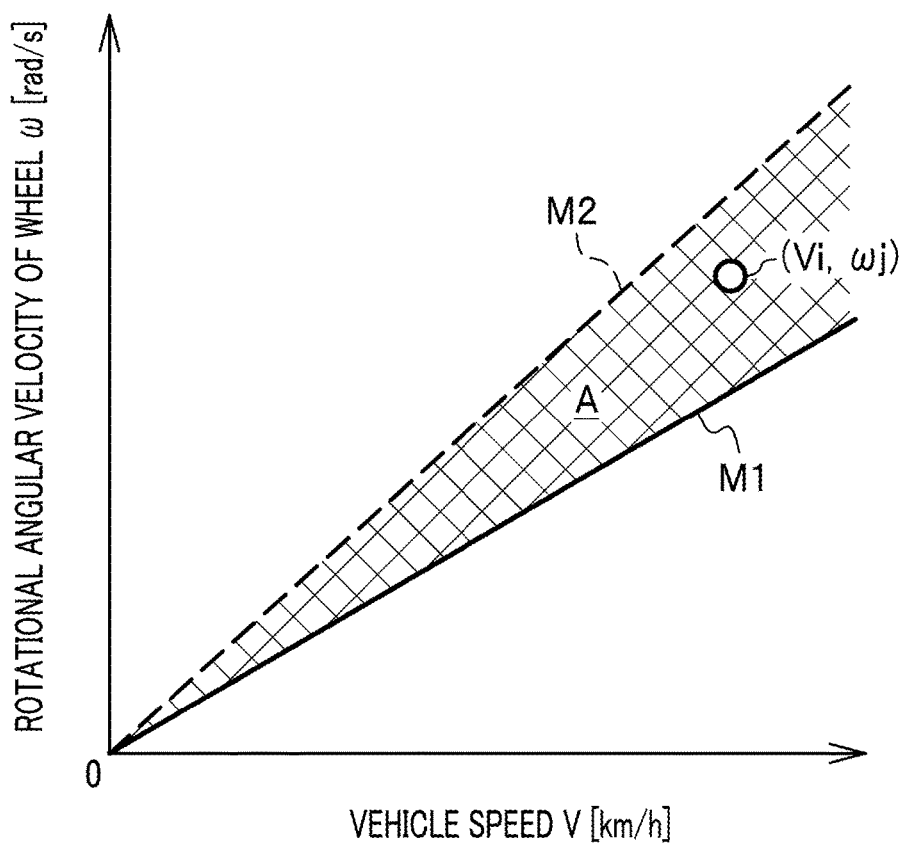
FIG. 7 is a chart showing one example of a map data used by the control unit.

FIG. 7 is a chart showing map data M1 that is referred to by the CPU 23. In the chart, the horizontal axis indicates the vehicle speed V [km/h] of the vehicle C (see FIG. 1), and the vertical axis indicates the rotational angular velocity ω [rad/s] of the wheel W. Further, in FIG. 7, map data M2 indicated by a dotted line represents a relation between a threshold value of the rotational angular velocity [rad/s] used for evaluating deflation and the vehicle speed (km/h).

Note that the map data M2 in the chart indicates the relation between the rotational angular velocity [rad/s] of the wheel W and the vehicle speed (km/h) having been pre-calculated with the use of the tire 14 set at the internal pressure threshold value Pt.

In the step S205, as shown in FIG. 7, the CPU 23 is assumed to detect a rotational angular velocity ωj of the wheel W at a vehicle speed Vi. The CPU 23 estimates the internal pressure of the tire 14 corresponding to the rotational angular velocity ωj, by an interpolation method with reference to the map data M1 having the internal pressure of the tire 14 set to the reference pressure Ps (measured internal pressure Pm) and the map data M2 having the internal pressure of the tire 14 set to the internal pressure threshold value Pt (Step S205).

The internal pressure threshold value Pt may be suitably set to a pressure lower than the recommended internal pressure Pr. The internal pressure threshold value Pt in the embodiment is set to a pressure of 80% of the recommended internal pressure Pr. Note that, since the internal pressure threshold value Pt in the embodiment is set lower than the reference pressure Ps (measured internal pressure), the effective rolling radius of the tire 14 set to the internal pressure threshold value Pt is smaller than the effective rolling radius of the tire 14 set to the reference pressure Ps. Therefore, the gradient (rotational angular velocity ω/vehicle speed V) of the map data M2 shown in FIG. 7 is steeper than that (rotational angular velocity ω/vehicle speed V) of the map data M1. Note that the shaded region A in FIG. 7 is a region where the estimated internal pressure Pe of the tire 14 after a thermal correction, to be described later, is determined by the CPU 23 to be at a normal pressure.

With reference to FIG. 6 again, the CPU 23 carries out the thermal correction on an estimated internal pressure value Pe' of the tire 14 calculated in step S205, to calculate the estimated internal pressure Pe of the tire 14 to be used for evaluating deflation. Then, the CPU 23 compares the estimated internal pressure Pe with the internal pressure threshold value Pt for evaluating deflation of the tire 14 (Step S206).

The thermal correction on the estimated internal pressure value Pe' of the tire 14 is carried out based on the outside air temperature Ta and the measured temperature Tm of the tire 14 at halt. Specifically, according to Charles' law, the estimated internal pressure Pe is calculated by multiplying the estimated value Pe' with the ratio of the outside air temperature Ta/the measured temperature Tm.

When the CPU 23 determines that the estimated internal pressure Pe is equal to or less than the internal pressure threshold value Pt, it executes the step of evaluating deflation of the tire 14. Specifically, as described above, the CPU 23 causes the display 5 to display the fact and instructs the alarm (not shown) to issue the warning sound. Such an evaluation is carried out independently for each of the tires 14FR, 14FL, 14RR, 14RL (see FIG. 1). This completes the series of operation by the system S.

Next, the advantageous effects of the system S according to the embodiment will be described.

In the system S of the embodiment, the control unit 2 (CPU 23) calculates the estimated internal pressure Pe based on the wheel speed (rotational angular velocity), the measured internal pressure Pm of the tire 14 at halt, and the measured temperature Tm of the tire 14 at halt. With the operation, the system S estimates the pressure of the tire 14 more accurately than a conventional indirect tire pressure monitoring system (see Patent Document 2 for example).

Further, in the system S of the embodiment, the measured internal pressure Pm and the measured temperature Tm are measured for each of the tires 14FR, 14FL, 14RR, 14RL (see FIG. 1), and the deflation evaluation is carried out independently for each of the tires 14FR, 14FL, 14RR, 14RL (see FIG. 1).

With the operation, the system S carries out, as in a direct tire pressure monitoring system, the deflation evaluation individually for each tire 14.

Further, in the system S, since the measured internal pressure Pm and the measured temperature Tm are measured with the air gauge 3 that is connected to the air valve V of the tire 14, the measured internal pressure Pm and the measured temperature Tm are detected more accurately. In other words, the system S estimates the pressure of the tire 14 more accurately.

Still further, in the system S, the measured internal pressure Pm and the measured temperature Tm are wirelessly transmitted between the transceiver 323 (wireless transmitter) of the air gauge 3 and the transceiver 21 (wireless receiver) of the control unit 2. Accordingly, the system S does not need wirings between the air gauge 3 and the control unit 2, to have a reduced size. The system S does not need burdensome operation such as wiring connections between the air gauge 3 and the control unit 2.

Yet further, in the system S, the control unit 2 (estimated internal pressure corrector) corrects the estimated internal pressure Pe based on the outside air temperature Ta from the outside air temperature sensor 4. Thus, the system S estimates the pressure of the tire 14 more accurately according to the outside air temperature Ta.

What is claimed is:

1. An indirect tire pressure monitoring system comprising an estimated internal pressure transmitter that calculates and transmits an estimated internal pressure of a tire when a vehicle is travelling based on a wheel speed, a measured internal pressure of the tire at halt, and a measured temperature of the tire at halt,
    wherein the estimated internal pressure transmitter comprises a CPU and a memory, and
    wherein a map data that is based on a vehicle speed and a wheel speed is stored in the memory.

2. The indirect tire pressure monitoring system according to claim 1,
    wherein the measured internal pressure and the measured temperature are obtained with a tire information measuring device that is connected to an air valve of the tire.

3. The indirect tire pressure monitoring system according to claim 2,
    wherein the tire information measuring device includes a wireless transmitter that transmits the measured internal pressure and the measured temperature, and
    wherein the estimated internal pressure transmitter includes a wireless receiver that receives the measured internal pressure and the measured temperature from the wireless transmitter.

4. The indirect tire pressure monitoring system according to claim 3 further comprising:
    an outside temperature sensor that transmits an outside temperature to the estimated internal pressure transmitter; and
    an estimated internal pressure corrector that corrects the estimated internal pressure based on the outside temperature.

5. The indirect tire pressure monitoring system according to claim 2 further comprising:
    an outside temperature sensor that transmits an outside temperature to the estimated internal pressure transmitter; and
    an estimated internal pressure corrector that corrects the estimated internal pressure based on the outside temperature.

6. The indirect tire pressure monitoring system according to claim 1 further comprising:
    an outside temperature sensor that transmits an outside temperature to the estimated internal pressure transmitter; and an estimated internal pressure corrector that corrects the estimated internal pressure based on the outside temperature.

7. The indirect tire pressure monitoring system according to claim 1 wherein the map data includes first map data based on a relation between vehicle speed and wheel speed at the measured pressure of the tire and second map data based on a relation between vehicle speed and wheel speed at an internal pressure threshold value of the tire which is set lower than a recommended internal pressure value of the tire.

8. The indirect tire pressure monitoring system according to claim 7 wherein the first map data defines a first gradient and the second map data defines a second gradient that is steeper than the first gradient,
wherein a region defined by the first and second gradients is the region where a second estimated internal pressure of the tire after a thermal correction is determined by the CPU.

9. The indirect tire pressure monitoring system according to claim 8, wherein the CPU corrects the estimated internal pressure of the tire based on the second estimated internal pressure, the tire measured temperature of the tire at halt, and the outside temperature.

* * * * *